May 26, 1959        V. W. BOLIE        2,888,671

ELECTROSTATIC METER

Filed March 30, 1956

INVENTOR.
VICTOR W. BOLIE
BY
*Moody & Haberkin*

ATTORNEYS

United States Patent Office 2,888,671
Patented May 26, 1959

2,888,671

ELECTROSTATIC METER

Victor W. Bolie, Cedar Rapids, Iowa, assignor to Collins Radio Company, Cedar Rapids, Iowa, a corporation of Iowa Application March 30, 1956, Serial No. 575,175

1 Claim. (Cl. 340—347)

This invention relates to metering devices and more particularly to electrostatic meters and to an application thereof to binary code decoders.

Prior art electrostatic voltmeters have become obselete in view of new circuit techniques; the manufacture thereof, as by mass production, is slow.

Further, prior art binary code decoding systems have been complicated and cumbersome. Where vacuum tube circuits have been employed in conjunction with meter means for indicating the decoded element, undue complication and circuitry has been necessary. Mechanical devices similarly have been bulky and not too reliable in indicating a decoded result. Further, the response time of the mechanical or of the electromechanical systems has been undesirably slow.

It is an object of this invention to provide a new electrostatic meter.

It is a further object of this invention to provide a simple and easily made electrostatic meter which can be fabricated in a manner consistent with modern day techniques.

It is a further object of this invention to provide an electrostatic meter which is applicable to "micro-strip" or other high frequency open transmission line applications.

It is yet a further object of this invention to apply electrostatic meter principles to binary code decoding devices.

It is a feature of this invention that this electrostatic meter is capable of coupling to structures made by techniques recently devised for ultra-high-frequency open transmission line. In use, the voltmeter becomes a termination of a spur of such transmission line.

It is a further feature of this invention that modification of an electrostatic meter provides a multiple circuit metering system which indicates the solution to the binary code applied to said multiple circuit to said multiple circuit input.

It is yet a further feature that the high frequency capabilities of the new meter acts to enhance its decoding capabilities.

Further objects, features, and advantages of this invention will become apparent from the following description and claim when read in conjunction with the drawing, in which:

Figure 1:
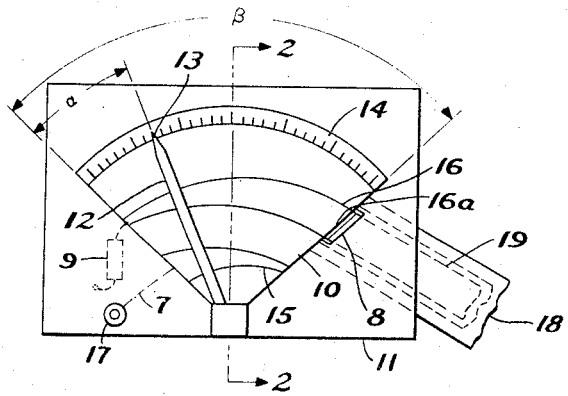
Figure 1 shows a simple single circuit electrostatic measuring device.

In Figure 1 an insulating board 10 is mounted on a base 11 which may be either insulating or conducting as desired. Here base 11 is conductive and considered a ground plane. A needle 12 is suspended above insulating base 10. Needle 12 has a point 13 which cooperates with a scale 14 to indicate the voltage applied. On insulating base 10 are two crescents 15 and 16 which are centered and extend along circumferences of circles concentric with the pivot of needle 12, between two radii spaced $\beta$ degrees apart. The deflection of needle 12 under an applied potential is considered $\alpha$.

Crescents 15 and 16 have center lines which are each at a constant radius from the pivot point of needle 12. The width of the crescent is a decreasing linear function of the needle angle $\alpha$ as to crescent 15 and inversely so as to crescent 16.

A terminal 17 is provided for connection to crescent 15. A lead wire 7 under the ground plane 11 connects terminal 17 to crescent 15. This wire is run in this manner to avoid undue stray electrostatic field adjacent the orbit of the needle. A "micro-strip" or other transmission line of the open type 18 made in accord with recent techniques for conducting ultra-high-frequency voltages is brought in to the end of crescent 16 from the underside of ground plane 11. This transmission line is brought in in this manner to avoid an undue stray field over that established by the crescent 16. This construction prevents the large area of conductor 19, when charged, from unduly attracting needle 12. The conductor 19 is brought up to the end 16a of crescent 16 through hole 8.

It is obvious that if crescent 16 has the same physical characteristics relative to the ground plane 11 as the conductor 19 of the transmission line 18, crescent 16 with its taper acts as a termination thereof. The termination of the "micro-strip" or other transmission line connected to crescent 16 is completed by a terminating resistor 9 of the proper value. Resistor 9 is shown as a unit resistance but may be a printed circuit type of resistor. This resistor is connected between the ground plane and the end of crescent 16 opposite its connection to the unknown voltage. This terminating resistance prevents reflections or standing waves.

For use as a direct or low frequency voltmeter crescent 16 may be provided with a terminal similar to terminal 17 for normal wired circuit connection.

Figure 2:
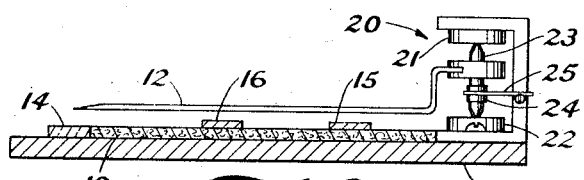
Figure 2 shows a section of Figure 1 along section 2—2.

Figure 2 shows a cross section of Figure 1. On base 11 is mounted insulating plate 10, scale 14, and bearing structure 20 for needle 12. On insulating plate 10 are crescents 16 and 15 which are shown in exaggerated thickness here for convenience of illustration. The crescents under this invention may be laminated, plated by various electrical means, glued-on foils, or the result of etching or any of the various printed circuit techniques for leaving a "printed circuit" on an insulating board. The modes of construction of the recent innovations in ultra-high-frequency techniques, such as "micro-strip" may be used, to permit use of the meter in such circuits. The thickness of the crescents are, therefore, very thin, consistent with the printed circuit techniques.

Bearing structure 20 consists of two bearings 21 and 22 in which rides pyramidally-pointed shaft 23. Shaft 23 supports needle 12. Bearings 21 and 22 may be jewels or miniature ball bearings or any other means of meter movement support well known in the art. The ends of shaft 23 are shaped in accord with the type of bearing used and are generally conical. On axle 23 is a slip ring 24 which is for grounding the needle.

Actually, no additional material need be used if pivot 23 is metallic and conductively connected to needle 12. Otherwise, some connection will be needed between needle 12 and slip ring 24. A preferred form of this slip ring is a thin coating of rhodium plating which has the best wear resistance and least striction. Riding on slip ring 24 is a brush or contact 25. Brush 25 completes the ground connection from needle 12 to the bearing structure 20. Also, a non-moving contact is made which is used to connect needle 12 to the ground or other reference point of the electrical system.

In use, a known voltage is connected to crescent 15 and an unknown voltage is connected to crescent 16 by "normal" wired circuitry, or by "micro-strip" technique, as illustrated. Due to electrostatic attraction, needle 12 will seek the position of least work and thus balance the attractive force from crescent 15 with the attractive force of crescent 16.

The capacitance between the crescent 16 and the needle can be expressed as:

$$C_{15} = a_{16} + b_{16}\left(\frac{\alpha}{\beta}\right) \quad (1)$$

The capacitance of crescent 15 relative to needle 12 is:

$$C_{15} = a_{15} + b_{15}\left(1 - \left(\frac{\alpha}{\beta}\right)^2\right) \quad (2)$$

The tangental force $f$ acting on the plates of the capacitor is the partial derivative of the energy stored in the capacitor with respect to distance and is for crescents 16 and 15, respectively, $$f_{16} = \frac{\partial w_{16}}{\partial s_{16}} = \frac{1}{r_{16}} \frac{\partial}{\partial \alpha}\left(\frac{c_{16}v_{16}^2}{2}\right) = \frac{v_{16}^2 b_{16}}{2r_{16}\beta} \quad (3)$$

$$f_{15} = \frac{\partial w_{15}}{\partial s_{15}} = \frac{1}{r_{15}} \frac{\partial}{\partial \alpha}\left(\frac{c_{15}v_{15}^2}{2}\right) = -\frac{v_{15}^2 b_{15}}{r_{15}\beta^2}\alpha \quad (4)$$

where $w$ is the energy stored, $v$ is the voltage applied, and $s$ is distance which equals the product of $r$ (radius) and $\alpha$, angular deflection.

The moment about the needle pivot is the summation of the product of the forces multiplied by the radii at which the forces are produced and are:

$$m_{16} = r_{16}f_{16} = \frac{v_{16}^2 b_{16}}{2\beta} \quad (5)$$

$$m_{15} = r_{15}f_{15} = -\frac{v_{15}^2 b_{15}}{\beta^2}\alpha \quad (6)$$

The total moment of forces acting on the needle is the sum of Equations 5 and 6. The needle will rotate about the pivot until the total moment becomes zero at which point $m_{16}$ equals $m_{15}$, or, solving for deflection, $$\frac{\alpha}{\beta} = \frac{b_{16}}{2b_{15}}\left(\frac{v_{16}}{v_{15}}\right)^2 \quad (7)$$

It can be readily seen that the needle deflection $\alpha$ is proportional to the square of the ratio of the voltages applied to the crescents. As with moving-coil repulsion meters, the meter reads the R.M.S. value of the voltages applied to the crescents. For this reason, a direct voltage may be applied to crescent 15 as a standard or known-voltage and a voltage of any frequency, up to the high radio frequencies, applied to crescent 16. Application of the voltages to be measured to crescent 16 when made by micro-wave techniques such as "micro-strip" seen in Figure 1 permits use of the voltmeter at extremely high frequency without invalidating the accuracy of the indication.

Common to the capacitor art, effects of fringe fields are minimized by making the needle wide compared to the spacing between needle and crescents. Since the crescent 15 is inverse as to its force function to that of crescent 16, no spring or other return need be used in the meter movement, the electrostatic force providing a spring effect. The needle must be relatively rigid to prevent high potentials on the crescents from attracting the needle against the crescents. This is avoided by using crescents at a small radius relatively, by a balanced construction relative to the pivot, with the needle as a cantilevered element, or by a second, mirror-image set of crescents above the needle, making the needle path the central plane between the two sets of crescents.

Figure 3:
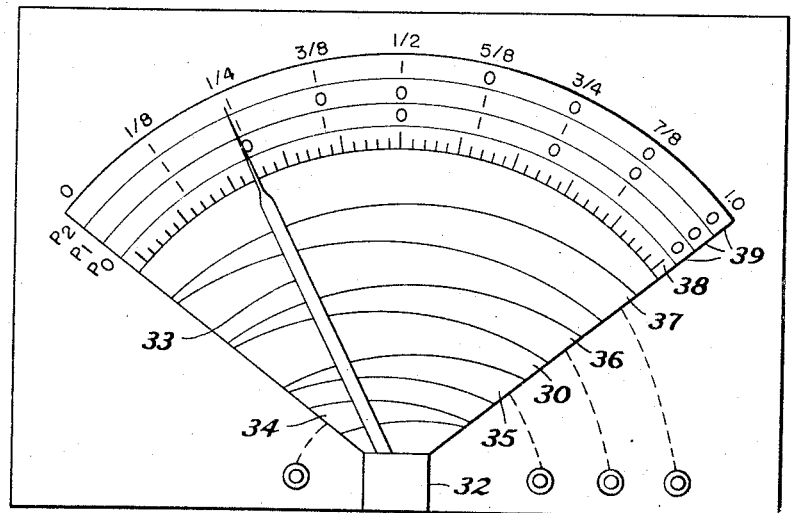
Figure 3 shows a form of a binary decoder in accord with the invention.

A modification of the electrostatic meter shown in Figures 1 and 2 provides a binary code decoding device. A version of the decoder is shown in Figure 3, utilizing printed circuit construction. An insulating panel 30 is mounted on a base 31. Also mounted on base 31 is a bearing structure 32 which is constructed similarly to the bearing structure 20 in Figure 2. Suspended by said bearing structure is a needle 33 having a conductive surface adjacent the near surface of the insulating panel 30. Metallic crescents 34, 35, 36, and 37 are formed on insulating board 30 by any of the methods enumerated above for crescents 15 and 16 in Figure 1. It is to be noted that crescent 34 and crescent 35 form a simple meter analogous to crescents 15 and 16 in Figure 1. Additionally, crescents 36 and 37 provide extra forces on needle 33. Outside of the radius of the crescents is a linear scale 38 and a binary scale 39. The binary scale is related to the needle indication as is discussed below. A standard, known voltage is applied to crescent 34 for supplying a restoring torque to the needle 33. The binary code voltages are applied to crescents 35, 36, and 37. The scales 38 and 39 may be metallic with etched or engraved indicia or formed of metal on the insulating board 30 by the same process which forms crescents 34–37.

For more circuits decoding a higher order binary number, obviously more crescents may be placed on insulating board 30.

The example given here shows a three-circuit meter system which decodes three-digit binary numbers. As in Figure 1, each crescent has a constant radius center line. The width of the crescents are increasing linear functions of deflection $\alpha$ from the zero position with the exception of crescent 34 which is a decreasing quadratic function of needle angle $\alpha$.

In the analysis given below, terms relating to the various crescents have the subscript of the crescent reference numeral. Calculation of the capacitance, work, and force of each arc on the needle is readily calculated, parallel to the analysis relative to Figure 1. The sum of the moments of the force on needle 33 is:

$$M = \frac{v_0^2 b_0}{2\beta} + \frac{v_1^2 b_1}{2\beta} + \frac{v_2^2 b_2}{2\beta} - \frac{v^2 b \alpha}{\beta^2} \quad (8)$$

Since a standardized voltage is usually used in binary systems, the voltage of each crescent can be considered:

$$\begin{aligned}v_0^2 &= p_0 v^2 \\ v_1^2 &= p_1 v^2 \\ v_2^2 &= p_2 v^2 \\ v_n^2 &= p_n v^2\end{aligned} \quad (9)$$

where $n$ relates to the crescent applicable. If $$K = p_0 b_0 + p_1 b_1 + p_2 b_2 \cdots p_n b_n \quad (10)$$

Equation (8) can be resolved to $$M = \frac{v^2}{2\beta}\left(K - 2b\frac{\alpha}{\beta}\right) \quad (11)$$

As seen above in the discussion relative to Figure 1, the needle rotates about its pivot until the moment vanishes, yielding a deflection, with Equation 1 resubstituted, of $$\frac{\alpha}{\beta} = p_2 \frac{b_2}{2b} + p_1 \frac{b_1}{2b} + p_0 \frac{b_0}{2b} \quad (12)$$

In manufacturing the device, the crescent shapes are made such that $$\frac{b_{35}}{2b} = \frac{4}{8} \quad (13)$$

$$\frac{b_{36}}{2b} = \frac{2}{8} \quad (14)$$

$$\frac{b_{37}}{2b} = \frac{1}{8} \quad (15)$$

The position of the needle $\alpha$ relative to the full scale deflection $\beta$ is thus determined by $$\frac{\alpha}{\beta} = \frac{p_2 \cdot 2^2 + p_1 \cdot 2^1 + p_0 \cdot 2^0}{8} \quad (16)$$

Note that $p_n$ is the binary digit applied to crescent $n$.

In use, $p$ has the value of zero or one in binary code and some standardized voltage in amplitude as, e.g. 50 volts. The zero-moment needle position as the result of all of the forces is proportional to the binary number represented by the values of $p_n$ in the above Equation 16.

Substitution into Equation 16 of the binary digits one or zero shows that the three-digit binary number varying from 0–0–0 to 1–1–1 is uniquely translated to eighth fractions of one and indicated on the scale as shown in Figure 3. For a meter having a higher number of circuits for a bigger digit binary code, it is possible to use the meter to indicate in decimal system, as seen in scale 38, the value of the binary number or to indicate the actual binary number input. This makes it possible to use this device as a test meter for computers and the like where binary numbers are available from a distributor.

If a five-circuit meter having five crescents similar to 35, 36, and 37 is connected through a distributor to a "teletype" receiver using the five-baud system, and the needle indication labeled in terms of letters, the meter would indicate the particular letter transmitted in the teletype system.

By using the needle rotation to move a coding cylinder, the code indicated can be read off back into binary data and transmitted again. The read-off binary data can be in a different code system permitting the meter device to be a translating medium between one digital system and another.

It is clear from the algebraic expressions for the capacitance of the crescents to the needle that additional crescents have no effect on the moment about the needle pivot unless energized. Consequently, the only limits to the number of crescents and therefore the number of digits of the binary code to be decoded would be the physical or practical limits in construction of the device. As stated with reference to Figure 1, the effects of fringe fields which in this case may affect the certainty of the smallest binary digit, may be minimized by making the needle width large compared to its spacing from the crescents. The effects of needle bearing striction can be minimized by using larger radii for the crescents. Of course, in binary numbers the voltages applied to the inner crescents may be higher with the geometry of the crescents varied to maintain the equation of operation valid. The binary voltages may be applied by either wired, printed, or transmission-line techniques in accord with the frequencies involved.

Although this invention has been described with respect to particular embodiments thereof, it is not to be so limited because changes and modifications may be made therein which are within the full intended scope of the invention as defined by the appended claim.

I claim:

In a multiple element code decoding system wherein the elements of the code have been individually translated into a plurality of voltages and distributed onto a like plurality of wires, an electrostatic indicator comprising grounded conductive needle means, said needle means moving in a first plane, a first conductive crescent mounted adjacent to and parallel to said plane, said first crescent defining a second plane, the area of said first crescent decreasing as a quadratic function of the deflection of said needle, a plurality of conductive crescents mounted concentrically with said first crescent in said second plane, the areas of said plurality of crescents increasing linearly with rotation of said needle, and terminal means for each of said plurality of crescents adapted for connection to a plurality of wires whereby deflection of said needle indicates the intelligence contained in voltage carried by said wires.

References Cited in the file of this patent

UNITED STATES PATENTS 2,661,456     Bosch _____ Dec. 1, 1953